United States Patent [19]
Campbell

[11] Patent Number: 6,073,536
[45] Date of Patent: Jun. 13, 2000

[54] AUTOMOTIVE HYDRAULIC SYSTEM AND METHOD FOR DRIVING A HYDRAULIC ACCESSORY IN PARALLEL WITH A POWER STEERING UNIT

[76] Inventor: A. Keith Campbell, 3110 N. County Rd., 950 E., Brownsburg, Ind. 46214

[21] Appl. No.: 09/033,033

[22] Filed: Mar. 2, 1998

[51] Int. Cl.[7] .................................................. F15B 11/00
[52] U.S. Cl. ............................................. 91/516; 91/532
[58] Field of Search ............................. 91/511, 514, 516, 91/532

[56] References Cited

U.S. PATENT DOCUMENTS

| | | |
|---|---|---|
| 4,034,563 | 7/1977 | Orth ............................................. 60/422 |
| 4,385,674 | 5/1983 | Presley ..................................... 60/422 X |
| 4,488,401 | 12/1984 | Tischer ..................................... 91/516 X |
| 4,558,631 | 12/1985 | Fassbender .................................. 91/516 |
| 4,663,936 | 5/1987 | Morgan ..................................... 91/516 X |
| 5,056,311 | 10/1991 | Tischer ..................................... 91/516 X |
| 5,413,452 | 5/1995 | Lech et al. ............................... 91/516 X |
| 5,515,938 | 5/1996 | Haga et al. . |
| 5,535,845 | 7/1996 | Buschur . |
| 5,549,938 | 8/1996 | Sorensen ................................. 91/459 X |
| 5,692,735 | 12/1997 | Aho et al. ................................. 254/323 |
| 5,794,920 | 8/1998 | Kronberger .............................. 254/361 |
| 5,826,487 | 10/1998 | A'Hearn ..................................... 91/516 |
| 5,842,684 | 12/1998 | Aho ......................................... 254/344 |

OTHER PUBLICATIONS

Ceridona, Ron, "Deliver Yourself from Evil," 4x4 *Mechanix*, Mar. 1996.

Fluid Power Reference Issue, *Machine Design*, vol. 50, No. 22, 1, 72–74. Sep. 28, 1978.

Milemaker, Tested to the Extreme, "Off–Road Accessories" Brochure.

Milemaker 2–speed Hydraulic Winch System Advertisement.

Milemaker Winch Advertisement.

Morgan, Michael, "Liquid Winch, MileMarker's New Two–Speed Hypro Winch," *4WD & Sport Utility*, Apr. 1997.

Voss GmbH + Co., "An All–Round Range: Economic vehicle Components from VOSS".

Waterman Hydraulics, Hydraulic Control Valves Series 12, 14, 15, 17, 21 and 26, Catalog 1215/USA, BV7, 9, 25–26, Oct. 1995.

*Primary Examiner*—John E. Ryznic
*Attorney, Agent, or Firm*—Woodard, Emhardt, Naughton Moriarty & McNett

[57] ABSTRACT

An automotive hydraulic system having a power steering unit of a vehicle connected in parallel with an externally mounted, hydraulic-cylinder-powered accessory, such as a liftgate, snow plow or dump bed. The vehicle's power steering pump supplies the required hydraulic fluid to the power steering unit and to a cylinder in the accessory, simultaneously in the preferred embodiment and alternately in another. A preferred valve assembly is disclosed which includes a priority flow control valve and a three-position, four-way accessory control valve mounted together in a manifold designed for connection to the vehicle's power steering pump, power steering unit, and hydraulic fluid reservoir, and to a double-acting hydraulic cylinder in the accessory.

12 Claims, 11 Drawing Sheets

AUTOMOTIVE HYDRAULIC SYSTEM AND METHOD FOR DRIVING A HYDRAULIC ACCESSORY IN PARALLEL WITH A POWER STEERING UNIT

BACKGROUND OF THE INVENTION

This invention relates to the field of automotive hydraulic systems, and more particularly to automotive hydraulic systems having a power steering system which supplies power to another hydraulically powered device.

Various types of hydraulically powered accessories are commercially available for trucks, vans, and other automotive vehicles, including snow plows, liftgates and dump beds. In the case of liftgates, for example, all known present designs have two things in common: A hydraulic cylinder for motion, and a 12-volt self-contained hydraulic unit to power the cylinder. 12-volt self-contained pumps, although easily connected to a source of power in the vehicle, are unreliable, hard to maintain, have virtually no cold weather operability, and are one of the most expensive components of the lift.

It has been suggested in the past to supply hydraulic fluid under pressure from the power steering pump of a vehicle to certain hydraulic devices, e.g., a cooling fan in U.S. Pat. No. 5,535,845 to Buschur and a brake power booster in U.S. Pat. No. 5,549,361 to Sorensen.

The Sorensen system has a brake power booster and two series-connected solenoid valves connected in parallel with a power steering valve. A boost developing valve is added in the line from the hydraulic pump to the power steering valve to provide for transfer of fluid flow from a normally open one-way path to a one-way flow-restrictive path in response to a force being applied to the brake pedal. The system appears to be designed to maintain an essentially constant pressure for the brake booster regardless of the pressure or other requirements of the rest of the system. While such a system may be suitable for a brake booster, which is typically small enough to be filled with hydraulic fluid in substantially less than one second at a typical flow rate of about 4 gallons per minute (GPM) delivered by a power steering pump, it could cause a loss of power steering for several seconds if used in conjunction with an external device requiring larger volumes of fluid. Such a sustained loss of power steering would be especially likely if the device were operated at no load, because in that situation virtually all of the fluid would be diverted to the external device. The Sorenson patent contains no apparent recognition of such a potential problem or of the desirability of driving a relatively high-volume device in parallel with a power steering unit.

Buschur suggests a series combination of an automotive fan motor and a power steering unit and employs a bypass line around the fan motor to give priority to operation of the power steering unit, i.e., to halt the operation of the fan if the load on the pump becomes excessive.

A hydraulic winch powered by a vehicle's power steering pump is commercially available from MileMarker of Pompano Beach, Fla. The winch and the power steering unit are connected in series in the MileMarker system via a dual-solenoid valve with four ports. Flow from the pump to the steering gear box is rerouted through the valve to the winch, and back through the valve to the steering gearbox so that fluid is always flowing through the steering gearbox. A hand control with a connection to each solenoid is included.

There remains a need for valving systems that eliminate many recurrent problems and design limitations in connection with hydraulic accessories such as liftgates, snow plows, and dump beds.

SUMMARY OF THE INVENTION

The present invention meets this need and overcomes significant disadvantages of prior art devices by providing an automotive hydraulic system and method for driving a power steering unit of a vehicle in parallel with an externally mounted accessory having a hydraulic cylinder. The system makes use of the vehicle's existing power steering unit, hydraulic pump, and hydraulic fluid reservoir and includes a hydraulic accessory drive circuit connected in parallel with the power steering unit. In a preferred embodiment the hydraulic accessory drive circuit includes a three-position, four-way, accessory control valve having an inlet connected to the hydraulic pump, an outlet connected to the fluid reservoir, first and second accessory ports for connecting to the hydraulic cylinder, and a valve mechanism for selectively interconnecting either of the inlet and outlet to the first accessory port and the other of the inlet and outlet to the second accessory port.

In an embodiment of the present invention particularly suited for use with a hydraulically powered, vehicle-mounted snow plow or other accessory mounted on a vehicle and operated while the vehicle is in motion, an accessory control valve and a priority flow control valve are combined in a valving system kit along with a hydraulic line for connecting the outlet of the vehicle's power steering pump to the inlet of the priority flow control valve, another hydraulic line for connecting the priority outlet of the priority flow control valve to the steering-sensitive control valve in the vehicle's power steering system, a third hydraulic line for connecting the secondary outlet of the priority flow control valve to the accessory control valve, and a fourth hydraulic line for connecting the accessory control valve to a hydraulic cylinder in the accessory. The accessory control valve is preferably but not necessarily connected between the priority flow control valve and the cylinder.

In another embodiment, particularly suited for use with a hydraulically powered, vehicle-mounted liftgate or other accessory not normally used when the vehicle is in motion, an accessory control valve and a selector valve are mounted in a manifold with their inlets interconnected therein. A kit includes the two valves in the manifold along with external hydraulic lines for connecting (a) the vehicle's power steering pump to the common inlet of the valves, (b) the selector valve to the steering-sensitive control valve in the vehicle's power steering system, and (c) the accessory control valve to a hydraulic cylinder in the accessory.

A general object of the present invention is to provide an improved hydraulic system and method for driving a hydraulically powered accessory.

Another object is to provide an improved system and method for driving a hydraulically powered device from the power steering system of a vehicle.

A further object of the present invention is to enable the use of a vehicle's power steering pump to power an external vehicle-mounted accessory having a hydraulic cylinder, such as a liftgate, snow plow, or dump bed, in parallel with the vehicle's power steering unit, preferably with the capacity for simultaneous operation with priority flow to the power steering unit.

Further objects and advantages of the present invention will be more apparent upon reading the following detailed description of the preferred embodiment in conjunction with the accompanying drawings.

DESCRIPTION OF THE PREFERRED EMBODIMENT

Figure 1:
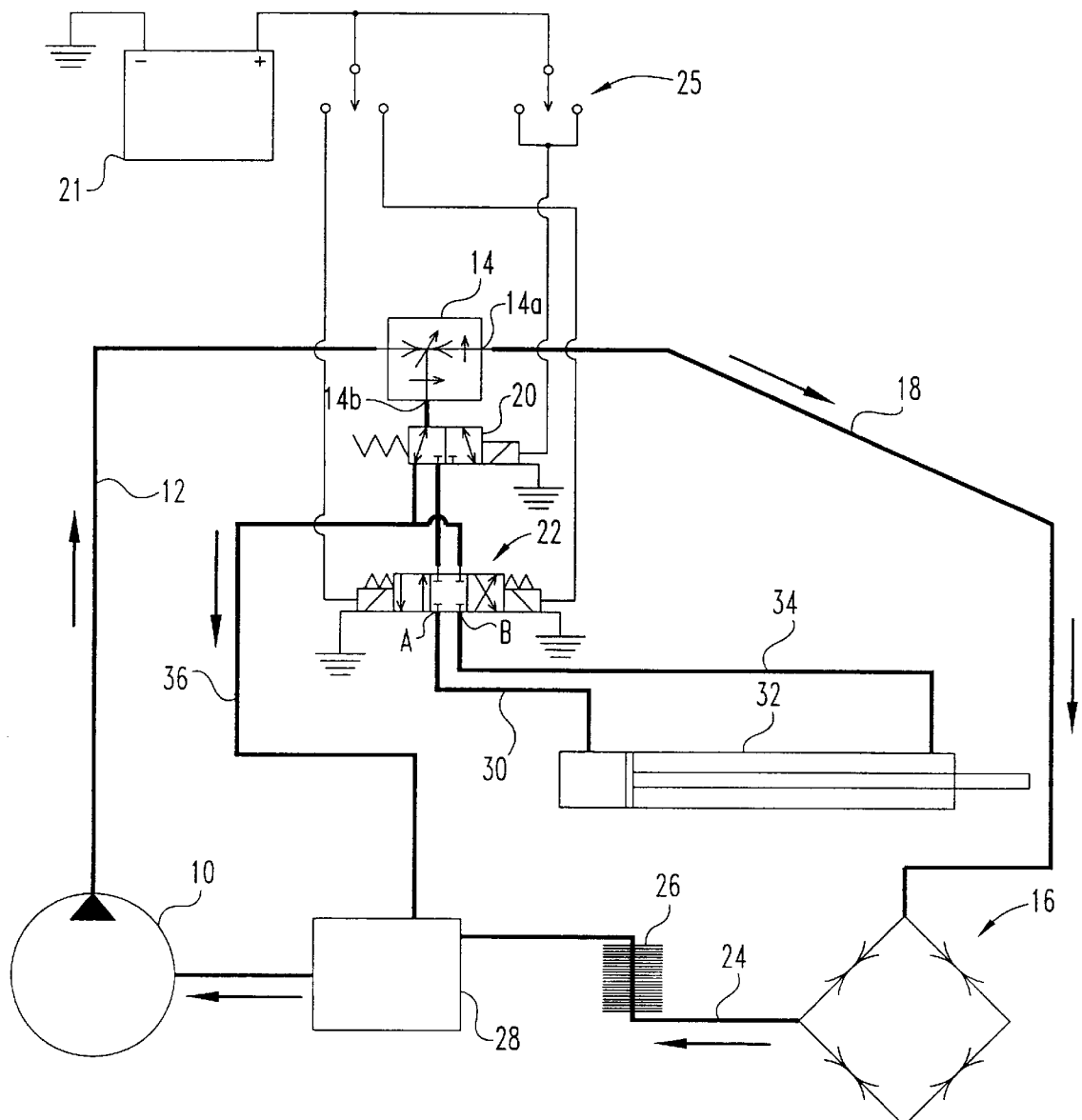
FIGS. 1–3 are schematic diagrams of a hydraulic system according to the preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
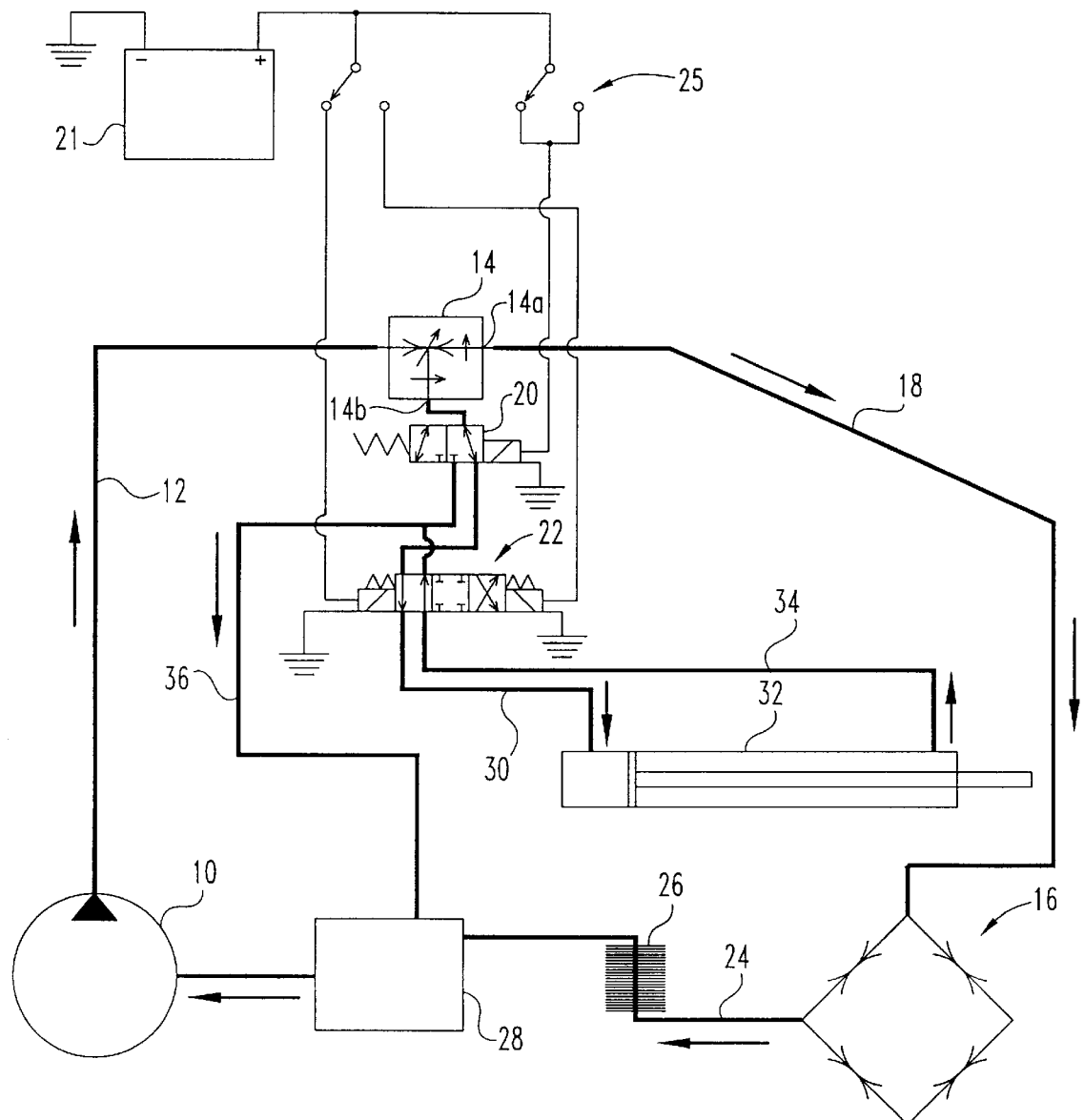
Figure 3:
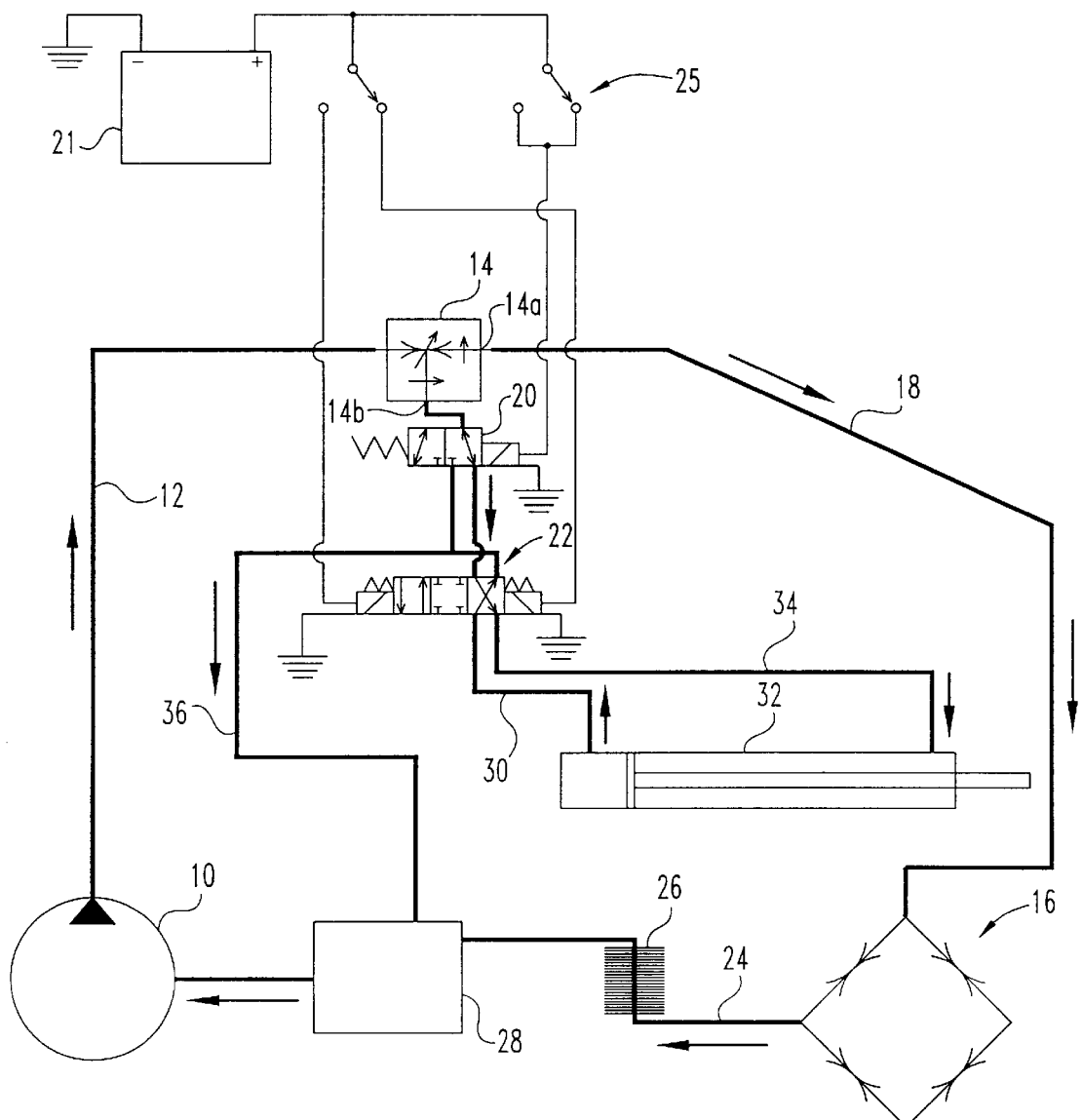
Figure 4:
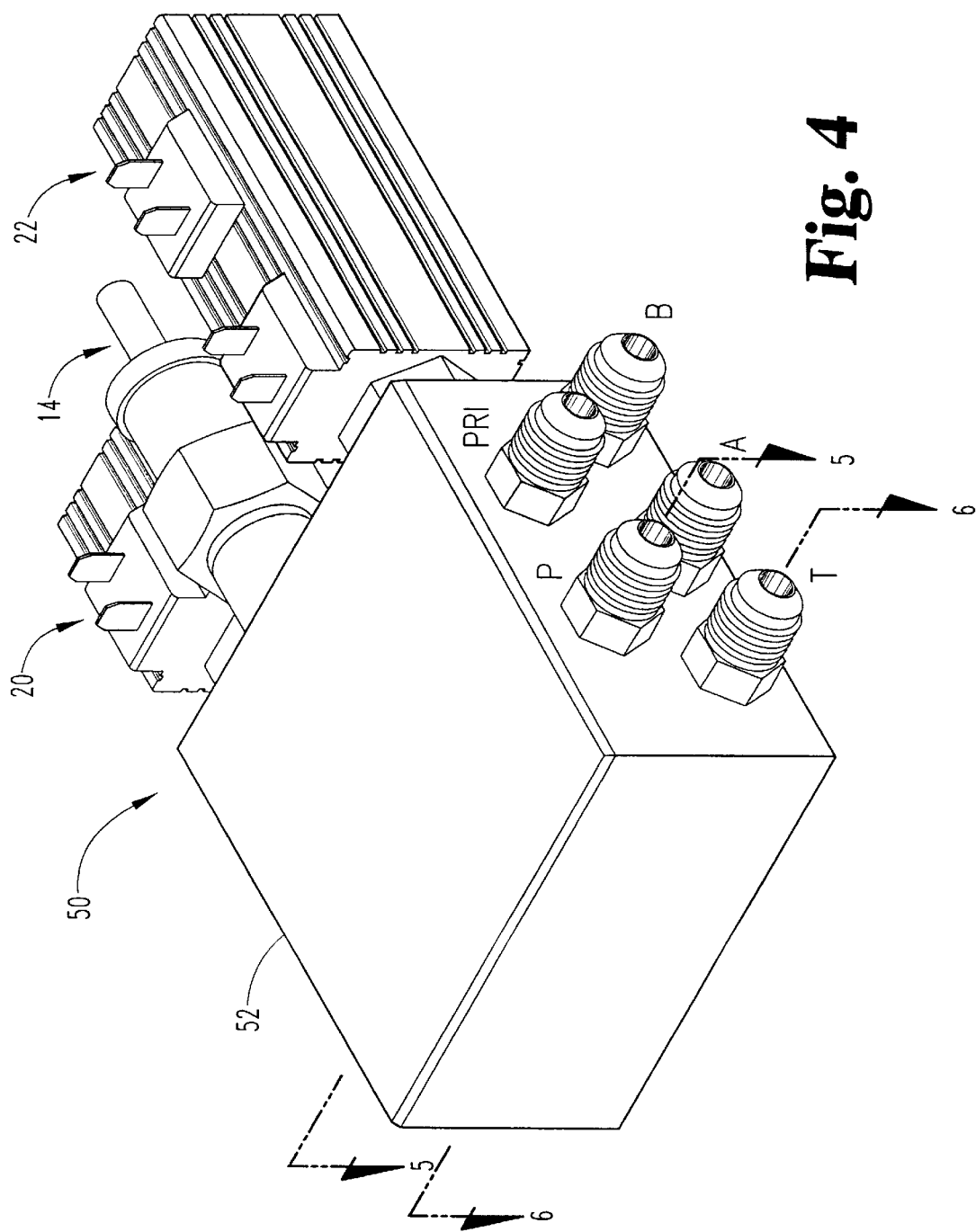
FIG. 4 is an upper right front isometric drawing of the preferred embodiment of a valve assembly according to the present invention.

A first embodiment of the present invention which is particularly suited for use with a hydraulically powered snow plow, dump bed or other accessory mounted on a truck or other vehicle and operated while the vehicle is in motion is shown schematically in FIGS. 1–3. In this embodiment normal power steering is maintained while allowing a hydraulic cylinder to be operated simultaneously. This embodiment is also useful with a liftgate, which, although not intended for use with a moving truck, is sometimes so used. A corresponding first embodiment of a valve assembly according to the present invention is shown in FIG. 4.

Hydraulic pump 10 in FIG. 1 is the power steering pump for the vehicle. Conventional pumps of this type generally have an internal flow control whereby they deliver hydraulic fluid at a constant flow rate to the power steering unit. For example, a typical half-ton pickup truck power steering pump delivers up to 1400 psi (9,653 kPa) at a rate of four gallons per minute (15.14 liters per minute), which is more than enough to power a conventional liftgate or snow plow of the type used with such a truck. The power steering pumps in larger trucks are capable of even higher pressures and volumes. Flow continues at the prescribed volumetric rate irrespective of system back pressure as long as the pump is able to deliver it. Therefore, pumps for such systems generally are provided with pressure relief lines which terminate the pumping action in case of excessive system loads.

The internal flow control in the power steering pump 10 is preferably modified for this embodiment to provide hydraulic fluid at a predetermined flow rate higher than the flow rate required by the steering unit. For example, with a power steering unit requiring approximately 2 GPM and with a pump designed to supply 4 GPM, the flow control is preferably set for a flow rate of 7 GPM. The flow control may be modified by boring out or otherwise increasing the size of an orifice therein which determines the available flow rate out of the pump. A C3HD GM pump, with the option of having two ports for connection of return lines and a port for connecting to an external reservoir, may be used with the valving system of the present invention, and is preferably modified as just described.

Hydraulic fluid is supplied from power steering pump 10 through a supply line 12 to a priority flow control valve 14, which may be a model 15CP1-S-405, commercially available from Waterman Hydraulics, Niles, Ill., with an adjustable flow setting range of 3–5 GPM for its priority flow outlet, and with the priority flow rate set, e.g., to 4 GPM. Valve 14 permits simultaneous flow from its priority outlet 14a to a power steering unit 16 through a supply line 18, and from a secondary outlet 14b to a selector valve 20 which is in turn connected to a three-position, four-way, self-centering solenoid valve 22 as shown in FIG. 1. Selector valve 20 may be a Waterman Model 14C34S-A12, and accessory control valve 22 may be a Waterman Model 15C7CS-A12. Power steering unit 16 includes a gearbox and a control valve responsive to operation of the vehicle's steering wheel, and discharges through an unpressurized return line 24 and a cooler 26 to a reservoir or tank 28 in a conventional manner. In operation, fluid from the tank is pumped into the power steering system and flows through the power steering unit at its normal flow rate, and any excess is diverted to valve 20, and thence normally to the tank but, when the accessory is actuated, to control valve 22.

Three-position valve 22 is shown in FIG. 1 in its center position in which neither one of its two solenoids is energized and in which the valve is therefore closed to fluid flow. The flow conditions obtaining with the valve closed are as indicated by the arrows in FIG. 1. The operator can shift the valve with a switch 25 which, as shown in FIG. 1, may be a DPDT switch having its common terminals both connected to the vehicle battery 21 and having switch terminals connected so as to energize the solenoid in selector valve 20 to cause that valve to supply fluid to valve 22 whenever the switch supplies power from the battery to either one of the solenoids in valve 22 to shift that valve to one of its open positions. The switch is preferably a momentary toggle switch. It may be fixed in position in the vehicle or on the accessory, or may be provided in a remote hand control connected through a length of cable and a quick-connect electrical connector to battery 21 and to the solenoids in valves 20 and 22, which are preferably mounted in the vehicle's engine compartment. A four-wire cable is sufficient for such purposes, with one wire for connecting to the battery, preferably with a fuse in that line, and one each for connection to the three solenoids. In the case of a liftgate, for example, such a remote control may be operated from the rear of the vehicle.

As an alternative, the switch may be an SPDT switch with the same connections to valve 22 as in FIG. 1, and with two diodes added between the solenoids to create a diode OR gate. That is, the diode anodes are connected to respective solenoids in valve 22, and the diode cathodes are both connected to the solenoid in valve 20, such that the solenoid in valve 20 is energized if either of the other two solenoids is energized. A three-wire cable is sufficient for the hand control in this case.

Fluid flow through the system when valve 22 is shifted to the left position (as viewed in the drawings) is as indicated by the arrows in FIG. 2. Hydraulic fluid flows through valve 22 and to a hydraulic line 30, typically a length of hydraulic hose, to the piston end of a double-acting hydraulic cylinder 32 which is of a conventional design and typically provided as part of the accessory, at least as an optional alternative to a single-acting cylinder. The fluid flow into the hydraulic cylinder with valve 22 in this state causes the cylinder rod to extend outwardly and causes fluid to flow from the rod end of the cylinder under low pressure through a return line 34, valve 22 and another return line 36 to tank 28.

The flow conditions obtaining when the three-position valve is shifted to the right are illustrated schematically in FIG. 3, from which it can be seen that hydraulic fluid flows through valve 22 to the rod end of the cylinder, thereby retracting the cylinder rod and allowing fluid to flow from the closed end of the cylinder under low pressure through line 30, valve 22 and return line 36 to tank 28. When the operator is finished operating the hydraulic cylinder in one direction or the other and all solenoids are deenergized via the hand control, the three-position valve centers itself, and the selector valve diverts fluid to the tank as indicated in FIG. 1.

Figure 5:
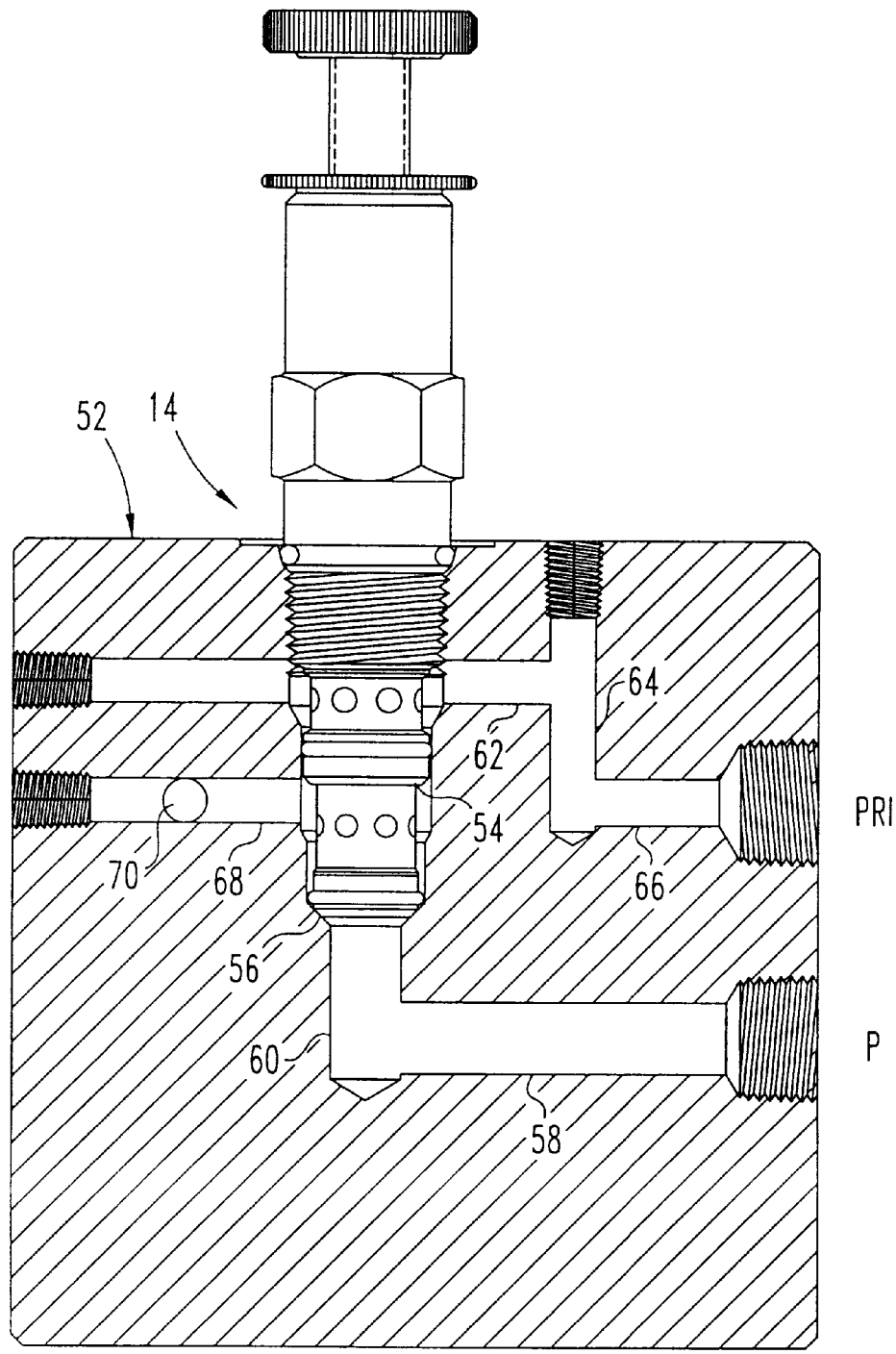
FIG. 5 is a cross-sectional view of the upper level of the manifold of FIG. 4 taken along lines 5—5 of FIG. 4.
Figure 6:
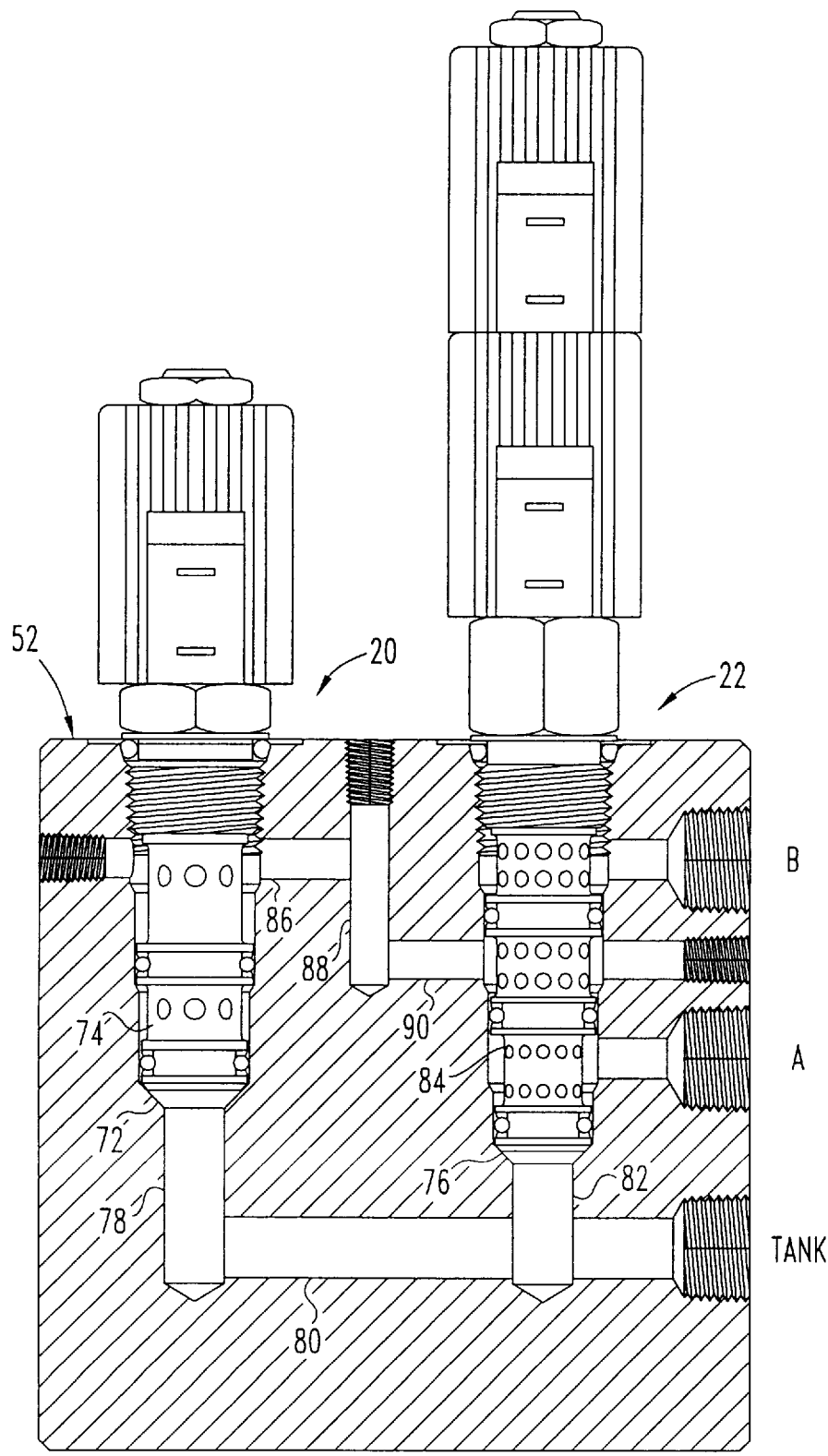
FIG. 6 is a cross-sectional view of the lower level of the manifold of FIG. 4 taken along lines 6—6 of FIG. 4.

Referring flow to FIGS. 4–6, the embodiment of the present invention illustrated in FIGS. 1–3 preferably employs a valve assembly 50 including the valve cartridges of valves 14, 20 and 22 threadedly mounted in a single manifold 52 as shown in the drawings. The manifold is provided with an upper level for the priority flow control valve 14 and its associated pump (P) inlet and priority (PRI) outlet ports, and a lower level for valves 20 and 22, the associated A and B ports of valve 22, and a common TANK port shared by valves 20 and 22. The upper level is shown in FIG. 5, which is the horizontal cross-section of the manifold through the centers of the two exposed upper level ports (P and PRI), with the cartridge 54 of valve 14 shown mounted in a cavity 56 provided for that purpose. The longitudinal axis of the valve cavity lies in the plane of the drawing along with the longitudinal axes of the P and PRI ports and of internal connecting passageways 58, 60, 62, 64, 66 and 68. The outer end of each valve cavity in the manifold is threaded for retention of the associated valve cartridge, which has a mating thread for that purpose.

Supply line 12 from pump 10 is terminated in the P port, which is in fluid communication with the inlet of valve 14 via passageways 58 and 60. Passageways 62, 64 and 66 interconnect the priority outlet 14a of valve 14 and the PRI port, which is connected to power steering unit 16 via supply line 18. Passageway 68 connects the secondary outlet or port 14b of valve 14 to the inlet of selector valve 20 through a vertical passageway 70 which extends down to a cavity 72 provided in the lower level of the manifold for the cartridge 74 of valve 20.

Referring to FIG. 6, the horizontal cross-section through the centers of the lower level ports, the longitudinal axes of the cavities 72 and 76 lie in a common plane with the three exposed ports and with internal connecting passageways 78, 80, 82, 86, 88 and 90. Passageways 78 and 80 connect the normally open outlet or port of valve 20 to the TANK port shared with valve 22 through passageway 82 connected to cavity 76 and the valve cartridge 84 mounted therein. The normally closed outlet of valve 20 is connected via passageways 86, 88 and 90 to the inlet of valve 22, which includes two axial passageways therein for selectively connecting the inlet to the A or B valve port and selectively connecting the TANK outlet to the A or B port not connected to the inlet.

The manifold is preferably formed of 6061T6 aluminum or, alternatively, of brass or other materials molded or otherwise formed as a one-piece structure, and its passageways and threaded ports and cavities are created in a conventional manner, with drilling, tapping and other machining procedures as appropriate. Passageways 62, 64 and 68 may be created by drilling into the manifold from a side or end wall, and tapping their outer ends which are then sealed with threaded plugs. Passageways 70, 86, 88 and 90 are similarly created and plugged at their outer ends.

Lines 12, 18, 30, 34, and 36, which all may be hydraulic hoses, may be precut or otherwise preformed and supplied in kit form along with the valve assembly including the manifold with valve cartridges, hose fittings, and seals mounted therein.

When accessory control valve 22 is in its left actuated position as viewed in FIG. 2, selector valve 20 is in its right actuated position in which it passes hydraulic fluid flowing out of the secondary outlet of valve 14 to the inlet of valve 22 via passageways 86, 88 and 90. That fluid then flows through one internal passageway in valve 22 to port A and therefrom to the piston end of the hydraulic cylinder. Fluid returns from the rod end of the cylinder through port B and the other internal passageway in valve 22 to the TANK port and therefrom to tank 26. These flow conditions cause extension of the cylinder rod.

When valve 22 is in its right actuated position as viewed in FIGS. 3, selector valve 20 is again in its right actuated position in which it passes hydraulic fluid from valve 14 to valve 22, as described above. In this case, hydraulic fluid flowing into the inlet of valve 22 flows through one internal passageway in valve 22 to port B and therefrom to the rod end of the hydraulic cylinder. Fluid returns from the cylinder through port A and the other internal passageway in valve 22 and therefrom to tank 26. These flow conditions cause retraction of the cylinder rod. At all times during operation of the hydraulic accessory in this embodiment, hydraulic fluid flows to the power steering unit on a priority basis.

Figure 7:
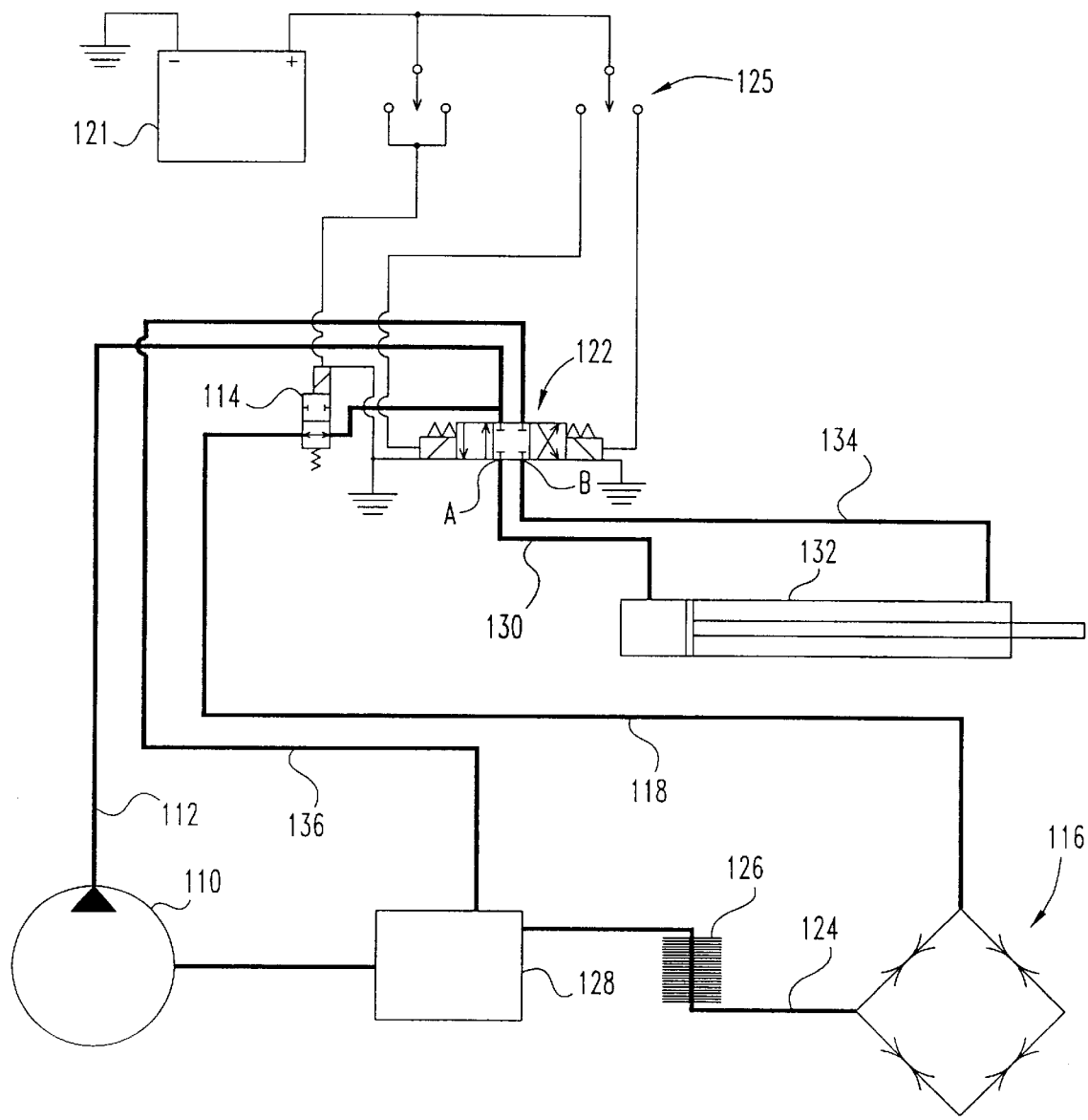
FIG. 7 is a schematic diagram of a hydraulic system according to a second embodiment of the present invention.

FIG. 7 is a schematic illustration of a second embodiment of the present invention. This embodiment is particularly suited for use with hydraulically powered accessories which are used when the vehicle is not in motion and therefore not in need of power steering. A hydraulically powered liftgate is one example of such an application.

The power steering pump 110 supplies hydraulic fluid through a supply line 112 to a normally open solenoid valve 114, the outlet of which is connected via another supply line 118 to the vehicle's power steering unit 116, which discharges through a return line 124 and a cooler 126 to a reservoir 128 in a conventional manner. A Waterman Model 14C25S-A12 valve is suitable for valve 114. With solenoid valve 114 in its normally open position as shown in FIG. 7, fluid from the tank is pumped into the power steering system and flows through the power steering unit at its normal flow rate.

Power steering pump 110 is also connected via line 112 to the inlet of a three-position, four-way, self-centering solenoid valve 122 which may be the same model valve as described above. The hand control in this embodiment is provided with a switch 125 for shifting valve 122 from its closed center position to a selected one of its two open positions and for closing valve 114 whenever valve 122 is so shifted. A DPDT switch with connections to battery 121 and to the valve solenoids as shown is suitable for such purposes, as described above with reference to FIG. 1. Ports A and B of valve 122 are connected to a hydraulic cylinder 132 in the accessory via hydraulic lines 130 and 134, respectively, and the hydraulic cylinder is controlled via the three-position, four-way valve in the manner described above with respect to the first embodiment. Fluid is returned to the tank through hydraulic line 136.

Figure 8:
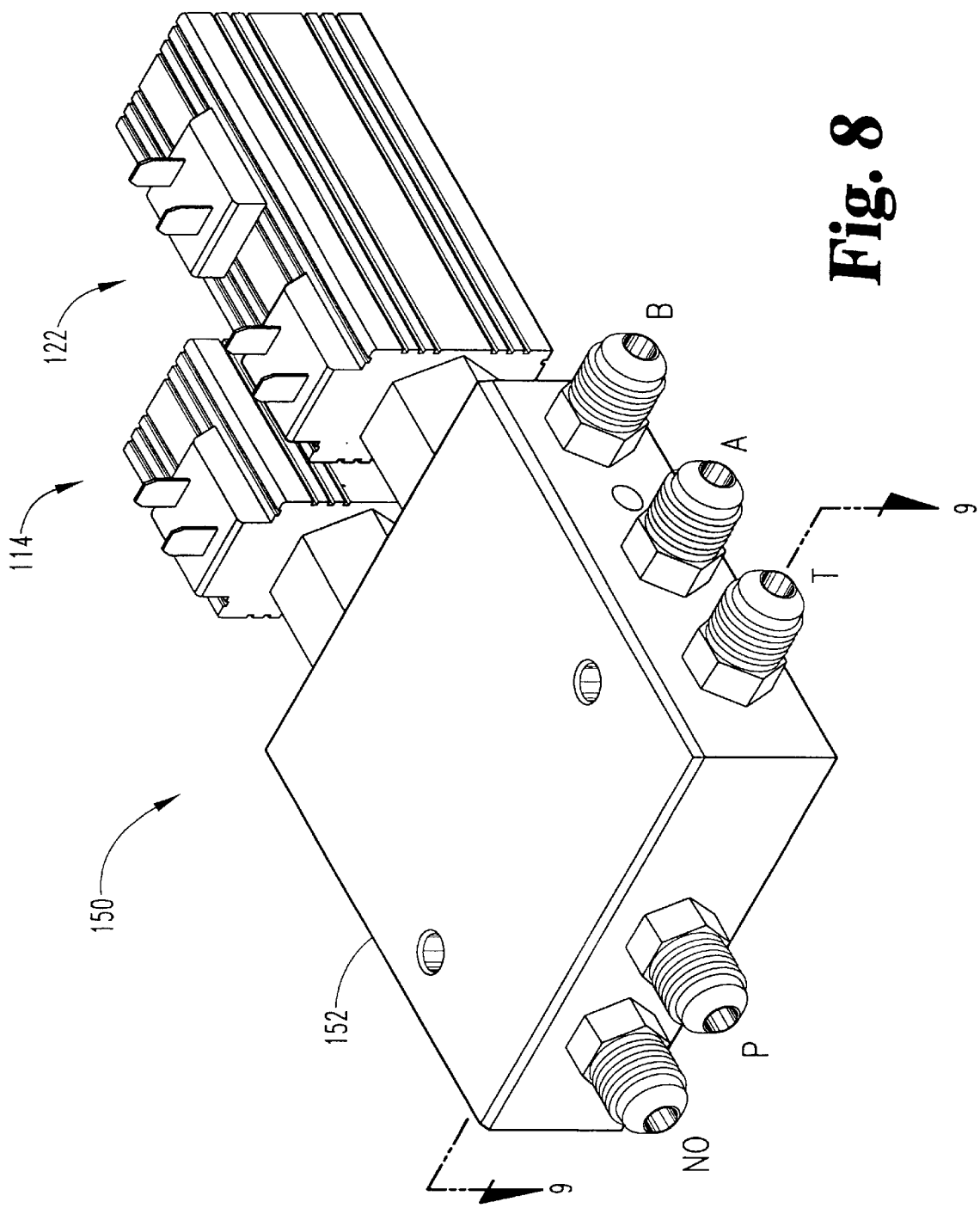
FIG. 8 is an upper right front isometric drawing of a second embodiment of a valve assembly according to the present invention.
Figure 9:
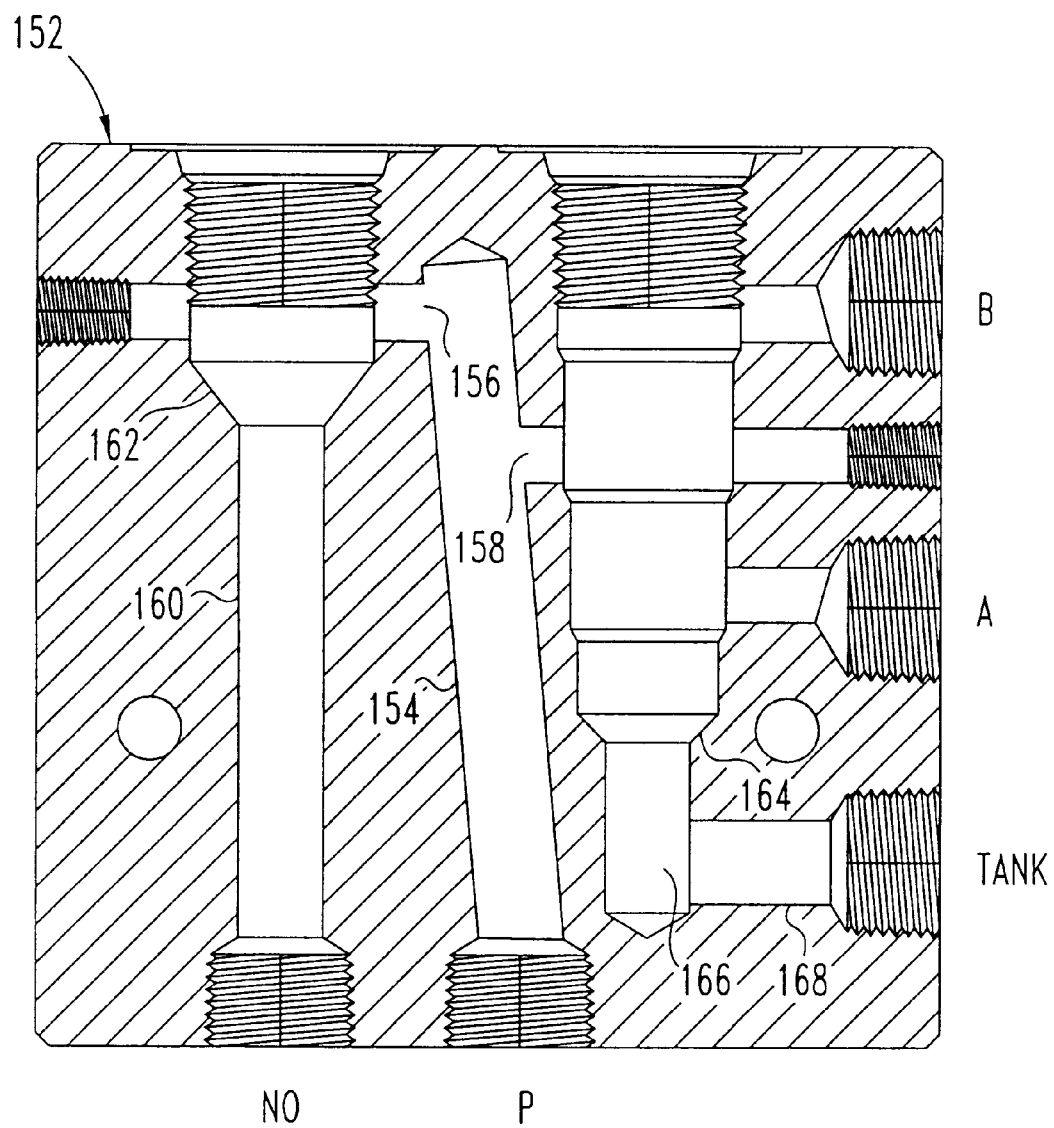
FIG. 9 is a cross-sectional view of the manifold of FIG. 8 taken along line 9—9 of FIG. 8.

A valve assembly 150, as shown in FIG. 8, is suitable for this embodiment, in which the manifold 152 is provided with all of its ports, internal passageways and cavities for the valve cartridges in a single level, i.e., with the longitudinal axes of all ports, passageways and cavities lying in a common plane. The horizontal cross-section of the manifold in that plane is shown in FIG. 9. Valves 114 and 122 share a common pump (P) inlet port and an associated central passageway 154 which extends to two side passageways 156 and 158, as shown in FIG. 9.

Supply line 112 from pump 110 is terminated in port P. One end of supply line 118 is connected to a normally open (NO) outlet port, and the other end of line 118 is connected to steering unit 116. An elongated passageway 160 extends between the outlet port and a cavity 162 provided for the cartridge of normally closed valve 114. When valve 114 is in its open position, the inlet port of the manifold (P) is in fluid communication with the outlet port (NO) through central passageway 154, side passageway 156, an internal passageway in valve 114, and passageway 160.

The cartridge of valve 122 is mounted in an elongated cavity 164 having a threaded end as shown in FIG. 9 and connected via passageways 166 and 168 to the TANK port. Side passageways 156 and 158 may be created and sealed in the same manner as side passageways 86 and 90 in the previous embodiment. The construction of valve 122 and its associated cavity and passageways connecting it to the A, B and TANK ports of the manifold is the same as described above with reference to FIG. 6 and needs no further description.

Lines 112, 118, 130, 134, and 136 may be precut or otherwise preformed and supplied in kit form along with the valve assembly including the manifold with valve cartridges, hose fittings, and seals mounted therein.

In operation, power steering is interrupted via closure of valve 114 whenever valve 122 is actuated. When valve 122 is in its left actuated position, hydraulic fluid flows from the pump through supply line 112 and internal hydraulic lines 154 and 158 in the manifold to valve 122, and through one flow path in the valve to port A and therefrom to the piston end of the hydraulic cylinder. Fluid returns from the cylinder through port B and the other flow path in the valve to the TANK port of the manifold, and therefrom to tank 26, and the cylinder rod extends.

When valve 122 is in its right actuated position, hydraulic fluid flows through lines 112, 154 and 158, and one flow path in valve 122, to port B and therefrom to the rod end of the hydraulic cylinder. Fluid returns from the cylinder through port A and the other flow path in the valve to the TANK port, and therefrom to tank 26, and the cylinder rod retracts.

Figure 10:
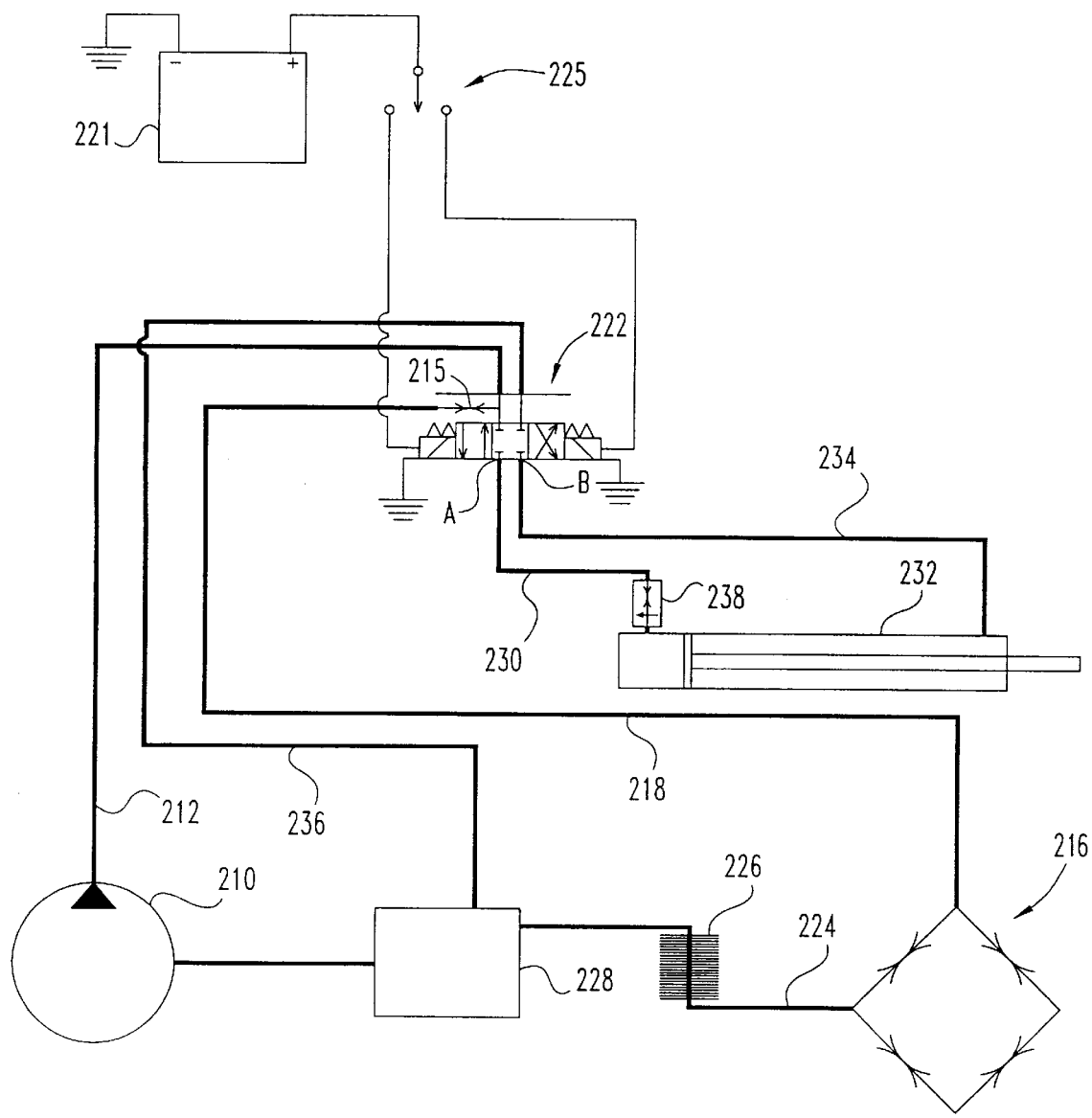
FIG. 10 is a schematic diagram of a hydraulic system according to a third embodiment of the present invention.

Another embodiment of the present invention is illustrated schematically in FIG. 10. This embodiment may be found useful for some applications where steering is desired while an accessory is in use, although the priority flow control of the first embodiment (FIG. 1) is generally preferred for such applications. As with the first embodiment, the internal flow control in the power steering pump is preferably modified to provide hydraulic fluid at a higher flow rate than the required flow rate for the steering unit. The modification in this case may desirably allow a flow rate higher than that provided by the modified steering pump of the first embodiment. For example, pump 210 may be modified to allow a flow rate of 8 GPM.

Fluid is supplied from the power steering pump with its modified flow control through a supply line 212 to another flow control 215 and simultaneously to a three-position, four-way, self-centering solenoid valve 222. The flow rate of the secondary flow control valve 215 is set to the vehicle's factory specifications for power steering. Valve 222 and its associated manifold may be the same as in the second embodiment, and the secondary flow control 215 may be mounted in cavity 162 in the manifold in place of the solenoid valve of that embodiment. An SPDT switch 225 is sufficient in this embodiment to selectively supply power from battery 221 to the two solenoids. Flow control 215 preferably allows a flow rate of at least 4 GPM, and flow controls 215 and 238 may both be 4 GPM flow controls of the type commercially available from Waterman hydraulics or others.

A flow divider, e.g., Waterman series 15CFDC, may be used as an alternative to two separate flow controls. Such a flow divider proportions the flow from a single source into two actuators. Flow passes through two orifices and creates a pressure drop which pulls the two associated spools away from each other, whereby the flow passes to two outlet ports with a division of flow determined by the orifice sizes. In such an alternative embodiment, the manifold is preferably modified to accommodate the flow divider in the same threaded mounting hole as used in the manifold of FIG. 9 for the solenoid valve. The valve cavity is extended accordingly, and the pump (P) inlet may be formed in the left sidewall of the manifold and connected laterally to the divider inlet of the flow divider, which has one outlet connected to side passageway 156 and another outlet connected to the outlet labeled "NO" in FIG. 9. A 50/50 division of flow is suitable with the 8 GPM flow rate out of the pump, although a flow divider may be selected to provide a greater percentage of fluid flow to the power steering unit if in the case of a lower pump output or otherwise desired in a given situation.

The connection of supply lines 212 and 218 to the manifold, as well as the interconnections of power steering unit 216, return line 224, cooler 226, and tank 228 are the same as their counterparts in the embodiment of FIG. 7, as is the connection of return line 236 between the manifold and tank 228. Lines 230 and 234 are connected to their associated hydraulic cylinder 232 in the same manner as their counterparts in the embodiment of FIG. 7 with the exception of an auxiliary flow control 238 which may be attached to the hydraulic cylinder if desired.

Figure 11:
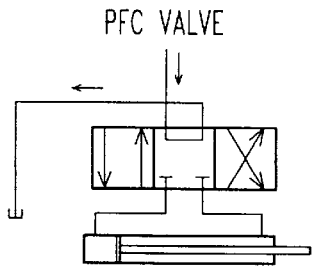
FIG. 11 is a schematic diagram of an alternative to a portion of the hydraulic system of FIG. 1 including an alternative form of a three-position, four-way valve.

FIG. 11 schematically illustrates a modification of a portion of the hydraulic system of FIG. 1. In this modification a three-position, four-way valve with an open center as shown in FIG. 11 is used in place of selector valve 20 and valve 22. That is, the secondary outlet of primary flow control (PFC) valve 14 is connected directly to the accessory control valve, which, when centered, passes fluid from valve 14 back to the tank as indicated by the arrows beside the lines in the drawing. The valve of FIG. 11 is otherwise the same as accessory control valve 22 in FIG. 1.

Figure 12A:
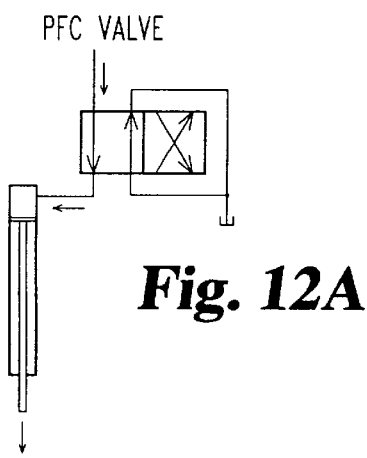
FIGS. 12—14 illustrate alternatives to a portion of the hydraulic system of FIG. 1 for use with single-acting cylinders.
Figure 12B:
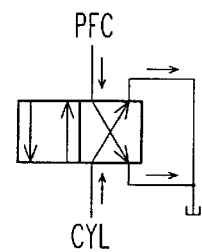

It is also contemplated that principles of the invention will be applicable to the control of single-acting cylinders, i.e., cylinders in which the piston is moved under hydraulic pressure in only one direction. When the fluid is allowed to drain from such a cylinder, the piston is returned to its starting position under some external force such as the force of gravity or a spring-return force. FIGS. 12A and 12B depict a two-position, four-way valve which may be used in place of valves 20 and 22 of FIG. 1 for control of a single-acting cylinder. The tank is connected to two ports of the valve as shown in the drawings. On the power stroke, shown in FIG. 12A, fluid flows from the secondary outlet of valve 14 through the accessory control valve to the cylinder, and the cylinder rod extends, as indicated by the directional arrows in the drawing. On the return stroke, shown in FIG. 12B, the fluid is forced out of the cylinder (CYL) under some external force and flows back to the tank through one flow path in the valve. Fluid from valve 14 flows through the other flow path in the valve to the tank.

Figure 13A:
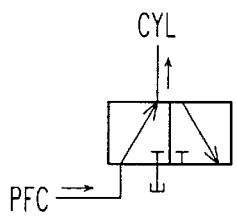
Figure 13B:
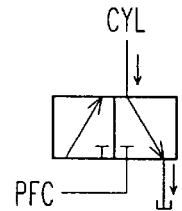

Similarly, a three-way valve as shown in FIG. 13 may be used to supply fluid from valve 14 to the cylinder on the power stroke, shown in FIG. 13A, and to drain fluid from the cylinder on the return stroke, shown in FIG. 13B. Effectively, the secondary outlet of valve 14 is closed on the return stroke of the cylinder, during which time the hydraulic pressure may increase and be relieved elsewhere in the system, for example, in the hydraulic pump or the power steering unit.

Figure 14A:
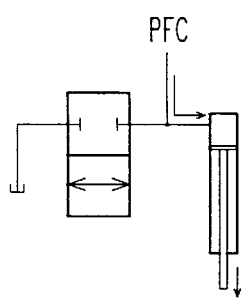
Figure 14B:
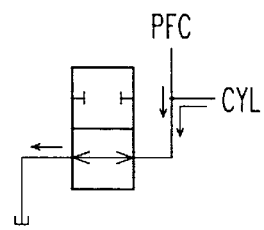

FIGS. 14A and 14B depict a similar circuit arrangement in the positions corresponding to the power stroke and return stroke, respectively. In this alternative embodiment the accessory control valve is not connected between the priority flow control valve and the hydraulic cylinder. Instead, the priority flow control valve and the cylinder are connected to the same port of the accessory control valve. The two valves are preferably interconnected by an internal line in a manifold, and are connected in common to the cylinder by a hydraulic line which is partly internal to the manifold and partly external.

The invention as described above is also suitable for other applications For example, handicap lifts, such as are used in vans, could also be driven in parallel with the power steering unit of the vehicle. The principles of the invention are also believed to be applicable in farming applications, for example, for control of fertilizer and salt spreaders and other accessories with hydraulic fluid from the power steering pump of a tractor.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An automotive hydraulic system for driving a power steering unit of a vehicle in parallel with a hydraulic-cylinder-powered accessory having a hydraulic cylinder, comprising:

a power steering unit having a control valve responsive to operation of a steering wheel;

a hydraulic pump having an internal flow control;

a hydraulic fluid reservoir having an outlet connected to said hydraulic pump;

a supply line interconnecting said hydraulic pump and said power steering unit;

a return line interconnecting said power steering unit and said fluid reservoir; and a hydraulic accessory drive circuit connected in parallel with said power steering unit, said hydraulic accessory drive circuit having an accessory control valve having an inlet connected to said hydraulic pump, an outlet connected to said fluid reservoir, first accessory port means for connecting to a hydraulic cylinder, and valve means for selectively connecting either of said inlet and said outlet to said first accessory port means, whereby hydraulic fluid is allowed to flow from said hydraulic pump selectively into said hydraulic cylinder to thereby control the accessory with power from the power steering system of the vehicle.

2. The automotive hydraulic system of claim 1, further comprising a priority flow control valve in said supply line between said hydraulic pump and said power steering unit, said priority flow control valve having an inlet connected to said hydraulic pump, a priority outlet connected to said power steering unit, and a secondary outlet connected to said inlet of said accessory control valve.

3. The automotive hydraulic system of claim 2, further comprising a three-way selector valve interconnecting said priority flow control valve and said accessory control valve, said selector valve having an inlet connected to said secondary outlet of said priority flow control valve, a first outlet connected to said fluid reservoir, and a second outlet connected to said accessory control valve inlet.

4. The automotive hydraulic system of claim 2, wherein said accessory control valve and said priority flow control valve are contained in a kit along with said supply line prior to assembly in said system, said supply line including first hydraulic line means for connecting said outlet of said hydraulic pump to said inlet of said priority flow control valve and second hydraulic line means for connecting said priority outlet of said priority flow control valve to said steering unit control valve, said kit further containing third hydraulic line means for connecting said secondary outlet of said priority flow control valve to said accessory control valve and fourth hydraulic line means for connecting said accessory control valve to a hydraulic cylinder in said hydraulic-cylinder-powered accessory.

5. The automotive hydraulic system of claim 4, wherein said kit further contains selector valve means in said third hydraulic line means for selectively supplying hydraulic fluid to said accessory control valve.

6. The automotive hydraulic system of claim 5, further comprising a valve manifold containing said accessory control valve, said priority flow control valve, said selector valve means, and said third hydraulic line means, wherein said fourth hydraulic line means comprises a hose external to said manifold.

7. The automotive hydraulic system of claim 6, wherein said fourth hydraulic line means comprises a pair of hoses.

8. The automotive hydraulic system of claim 1, further comprising:

a selector valve having an inlet and an outlet;

a valve manifold having said accessory control valve and said selector valve mounted therein and having an internal hydraulic line interconnecting the inlets thereof; and hydraulic line means for connecting said hydraulic pump to said steering unit in parallel with a hydraulic cylinder in said hydraulic-cylinder-powered accessory, said hydraulic line means including said supply line, said supply line including said internal hydraulic line, first external hydraulic line means for connecting said outlet of said hydraulic pump to said internal hydraulic line in said manifold, and second external hydraulic line means for connecting said selector valve outlet to said inlet of said steering unit control valve, said hydraulic line means further including third hydraulic line means for connecting said accessory control valve outlet to the hydraulic cylinder.

9. The automotive hydraulic system of claim 8, wherein said accessory control valve is a self-centering solenoid, spool-type, three-position, four-way valve, said system further comprising control means for closing said selector valve and blocking fluid flow to said power steering unit when said three-position, four-way accessory control valve is actuated in either direction from its center position.

10. The automotive hydraulic system of claim 1, further comprising a hydraulic-cylinder-powered accessory including a hydraulic cylinder having a fluid capacity of at least 15 cubic inches.

11. The automotive hydraulic system of claim 1, wherein said accessory control valve is connected to said hydraulic cylinder in a hydraulic line having unregulated pressure.

12. The automotive hydraulic system of claim 1, further comprising a valve manifold having said accessory control valve and said power steering unit control valve mounted therein and interconnected by an internal hydraulic line, said manifold having parallel external ports one of which is connected internally to an outlet of said accessory control valve and another of which is connected internally to an outlet of said power steering unit control valve.

* * * * *

UNITED STATES PATENT AND TRADEMARK OFFICE
CERTIFICATE OF CORRECTION

PATENT NO. : 6,073,536
DATED : June 13, 2000
INVENTOR(S) : A. Keith Campbell

It is certified that error appears in the above-identified patent and that said Letters Patent is hereby corrected as shown below:

Column 12,
Line 12, add the following:
--   13.   An automotive hydraulic system for driving a power steering unit of a vehicle in parallel with a hydraulic-cylinder-powered accessory having a double-acting hydraulic cylinder, comprising:
   a power steering unit having a control valve responsive to operation of a steering wheel;
   a hydraulic pump having an internal flow control;
   a hydraulic fluid reservoir having an outlet connected to said hydraulic pump;
   a supply line interconnecting said hydraulic pump and said power steering unit;
   a return line interconnecting said power steering unit and said fluid reservoir; and
   a hydraulic accessory drive circuit connected in parallel with said power steering unit, said hydraulic accessory drive circuit having a three-position, four-way accessory control valve having an inlet connected to said hydraulic pump, an outlet connected to said fluid reservoir, first and second accessory port means for connecting to first and second ends, respectively, of a double-acting hydraulic cylinder, and valve means for selectively connecting either of said inlet and said outlet to said first accessory port means,
   whereby hydraulic fluid is allowed to flow from said hydraulic pump selectively into said first or second end of said hydraulic cylinder to thereby control the accessory with power from the power steering system of the vehicle.

14.   The automotive hydraulic system of claim 1, further comprising a priority flow control valve in said supply line between said hydraulic pump and said power steering unit, said priority flow control valve having an inlet connected to said hydraulic pump, a priority outlet connected to said power steering unit, and a secondary outlet connected to said inlet of said accessory control valve.

UNITED STATES PATENT AND TRADEMARK OFFICE
CERTIFICATE OF CORRECTION

PATENT NO.    : 6,073,536
DATED         : June 13, 2000
INVENTOR(S)   : A. Keith Campbell It is certified that error appears in the above-identified patent and that said Letters Patent is hereby corrected as shown below:

Column 12, (cont'd),
15.    The automotive hydraulic system of claim 2, further comprising a three-way selector valve interconnecting said priority flow control valve and said accessory control valve, said selector valve having an inlet connected to said secondary outlet of said priority flow control valve, a first outlet connected to said fluid reservoir, and a second outlet connected to said accessory control valve inlet. --

Signed and Sealed this

Tenth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,073,536
DATED : March 2, 1998
INVENTOR(S) : Campbell

It is certified that error appears in the above-identified patent and that said Letters Patent is hereby corrected as shown below:

Column 12,
Line 12, claims 14 and 15 should read:

14. The automotive hydraulic system of claim 13, further comprising a priority flow control valve in said supply line between said hydraulic pump and said power steering unit, said priority flow control valve having an inlet connected to said hydraulic pump, a priority outlet connected to said power steering unit, and a secondary outlet connected to said inlet of said accessory control valve.

15. The automotive hydraulic system of claim 14, further comprising a three-way selector valve interconnecting said priority flow control valve and said accessory control valve, said selector valve having an inlet connected to said secondary outlet of said prioity flow control valve, a first outlet connected to said fluid reservoir, and a second outlet connected to said accessory control valve inlet.

Signed and Sealed this

Twenty-seventh Day of September, 2005

JON W. DUDAS
*Director of the United States Patent and Trademark Office*